June 11, 1957     U. C. S. DILKS     2,795,736
AUTOMATIC HEADLIGHT DIMMER
Filed Nov. 4, 1953
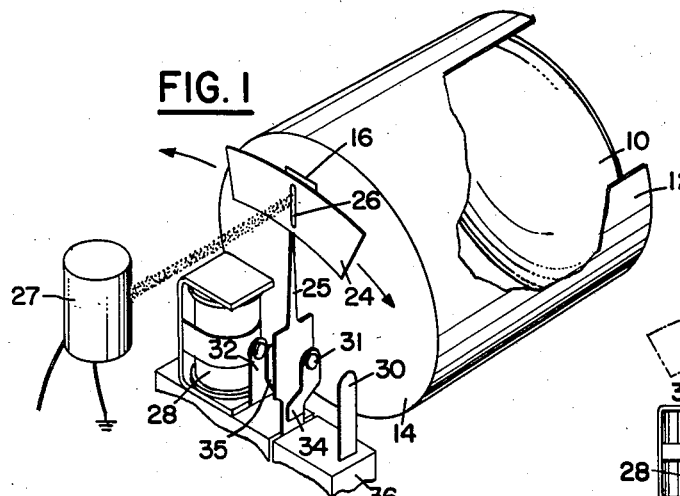
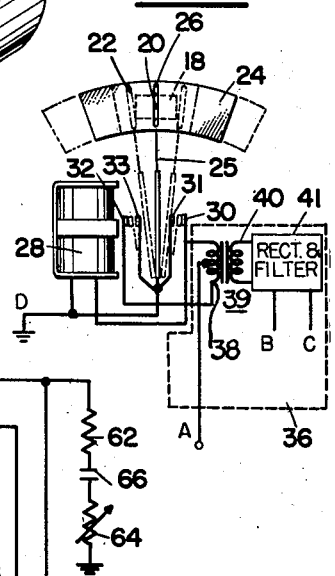
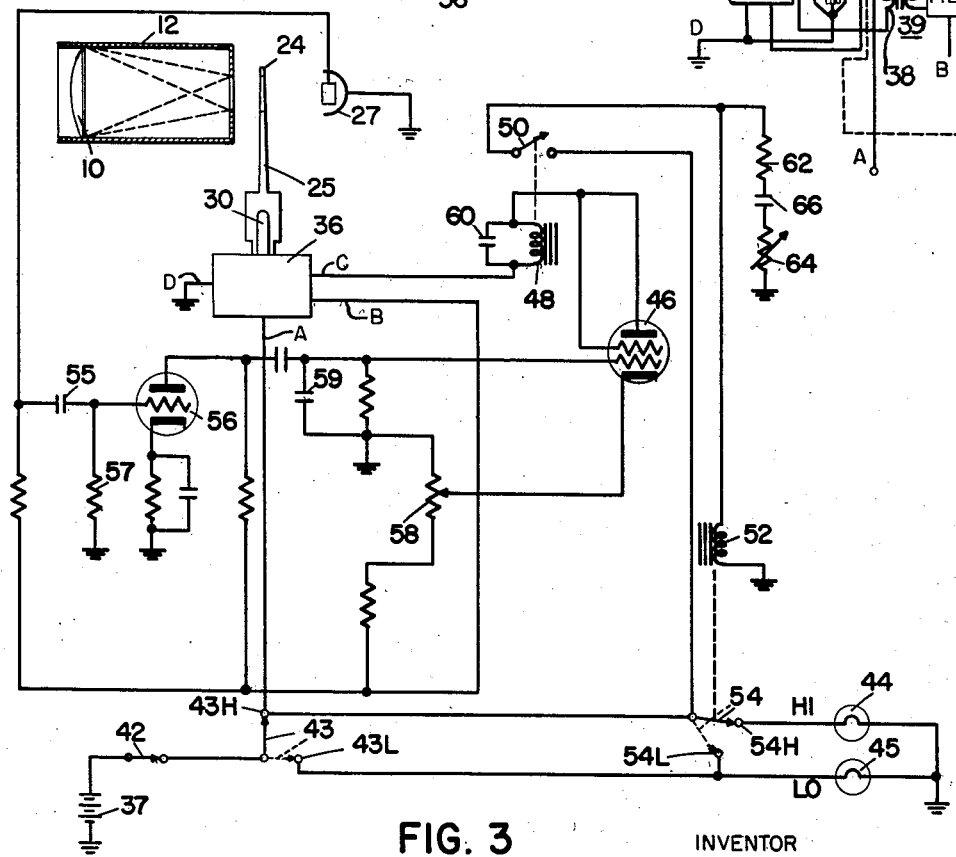
INVENTOR
USELMA CLARKE S. DILKS
BY
Ralzemond B. Parker
ATTORNEY

United States Patent Office 2,795,736
Patented June 11, 1957

2,795,736

AUTOMATIC HEADLIGHT DIMMER

Uselma Clarke S. Dilks, Ithan, Pa., assignor to Burroughs Corporation, Detroit, Mich., a corporation of Michigan Application November 4, 1953, Serial No. 390,108

9 Claims. (Cl. 315—83)

This invention relates to automatic headlight dimmers and particularly to automatic headlight dimmers utilizing a selected portion of the scanned image of the driver's field of vision as a control source for a headlight dimmer circuit.

Automatic headlight dimmers have been developed in the past operating on the total integration of the light received from the driver's field of vision which have proven to be sensitive to extraneous light and light controlling objects in addition to the illumination produced by an approaching vehicle. A further problem involved in photocell actuated systems is to provide a dependable electrical control signal insensitive to inherent variations in photocells in addition to extraneous light sources. To eliminate the detection of these undesired sources of light and photocell characteristics, it has been proposed to operate an automatic dimming system embodying an element scanning technique utilizing a Nipkow disk scanning element. However, element scanning systems require rather bulky and expensive devices and circuitry which may increase the maintenance problems of same. Various scanning means, light choppers and the like have been incorporated toward this end. Accordingly, an improved, inexpensive, automatic headlight dimming device is desired which utilizes a selected portion of the scanned image of the driver's field of vision as a control signal and yet minimizes the effect of the photocell characteristics and the extraneous light sources. Such a system should involve a minimum of associated equipment that is sufficiently reliable to withstand the shocks and vibrations encountered in customary usage of motor vehicles.

It is, therefore, a general object of the invention to provide an improved automatic headlight dimming device for motor vehicles.

It is another important object of the invention to provide an improved automatic headlight dimmer for motor vehicles of the type which incorporates means for scanning a selected portion of the light from the field of view.

It is still another important object of the invention to provide an improved automatic headlight dimmer which allows higher scanning speeds without substantially reducing the signal amplitude and which is insensitive to extraneous variations in light.

It is a further important object of the invention to provide an automobile headlight dimmer formed of few parts which are inexpensive to fabricate and assemble and which provides a dependable electrical signal for controlling the illumination of the headlights without being sensitive to extraneous sources of light.

The above identified and related objects are achieved by providing an automatic automobile headlight dimming device based on the scanning of a desired portion of the field of view of a driver of the vehicle equipped with same. The desired portion of the field has been found to best include a partial integration of the field along with the image of the headlights of an oncoming vehicle. An image of the desired field of view is optically focussed, masked down to a selected portion of the field, and rapidly scanned. To this end, the device is provided with a light interrupting member in the form of a slotted vane which rapidly oscillates or vibrates back and forth across the selected portion of the field of view.

The vibrating vane may be the same vane employed in the vibrator type rectifiers adapted to act as a scanning member. The scanned source is utilized to energize a photocell or other light responsive element to control a headlight dimming circuit. The controlled headlight dimming circuit is triggered by a pre-set photocell output to maintain the headlights in the desired position.

Other objects and features of advantage of the present invention will be found throughout the following more detailed description of the invention particularly when considered with the accompanying drawings in which like reference characters refer to similar elements.

Fig. 1 is a perspective view, partly broken away, of the optical system portion of an automatic automobile headlight dimming device constructed in accordance with the invention;

Fig. 2 is a schematic view of the vibrator mechanism showing how it serves both as a light and circuit interrupter; and Fig. 3 is a schematic illustration of one embodiment of the invention including a longitudinal cross sectional view through the optical system and a diagram of the headlight dimmer circuit.

Referring now to Figs. 1 and 2 the optical portion of the automatic headlight dimming device will be first described. A single light condensing lens 10 is positioned near the open end of the housing 12 to focus an image of the field of view of the driver of the vehicle equipped with the device. The housing 12 is provided with a wall or light stop 14 positioned to receive the image focussed thereon by the lens 10. The light stop is arranged with a substantially rectangular opening 16 to mask down the image of the field of vision thereby allowing only a portion of the light provided by the image to emerge from the housing 12. The rectangular image 18 that would emerge from the housing is more readily seen in Fig. 2; the image 18 may include an image 20 of a headlight of an approaching vehicle along with the general background illumination 22.

The rectangular image 18 is rapidly swept by an oscillating member or vane 24. The vane is preferably dimensioned so that it is slightly wider than the opening 16 and slightly more than twice the length of the opening. The dimensional characteristics are such that the vane blocks the opening in any position of its oscillating movements. The vane 24 is provided at its mid-portion with a narrow transversely extending aperture or slit 26 to further restrict or mask down the rectangular image of light 18. The vane 24 is oscillated so that the slit 26 traverses a path terminating just beyond the opposite ends of the opening 16. The light which passes through the slit of the vane is arranged to fall on a light sensitive element or photocell 27 which may be located directly behind the vane.

The vane 24 is provided with a flexible arm or blade 25 which is mounted so that the vane may be oscillated in a plane parallel to the opening 16. The vane may be oscillated by an ordinary interrupter door bell type circuit or by a vibrator type rectifier as employed in automobile radios or by any other suitable interrupting circuit. The aforementioned types of interrupting circuits generally provide a magnetic coil herein identified by the reference character 28 and switch contact means for opening and closing the coil circuit. In the illustrated embodiment of the invention, there are provided two relatively stationary contacts 30 and 32 disposed on opposite sides of the vibratory arm or blade 25 in the plane of vibratory movement thereof as indicated in Fig. 2, and there are provided two movable contacts 31 and 33 arranged to be struck by the blade as it vibrates and to be alternately moved into engagement with the contacts 30 and 32 respectively. The contacts 31 and 33 are preferably carried on flexible members 34 and 35 respectively which are capable of yielding movement when the contacts carried thereby engage their respective companion contacts 30 and 32.

In operation, the vane 24 is attracted by the coil 28 and when moved by this attraction it brings the contacts 30 and 31 into engagement with one another and shorts out the coil 28. The resulting de-energization of the magnet releases the vane and permits it to swing by virtue of its stored spring energy breaking contacts 30 and 31 thereby removing the shorted condition of the coil. However, the stored energy of the vane will carry it to the opposite extreme position of its vibratory movement bringing its contacts 32 and 33 into engagement with one another momentarily until the vane starts back under its stored energy toward the coil. During its return movement, the coil is again energized when the separate pairs of contacts 30—31 and 32—33 are broken.

An important feature of the invention is the utilization of the vibratory movement of the vane 24 to interrupt the headlight dimming circuit and function as a part of the rectifier therein. Thus, the vane functions as a light scanning element on one hand and a current rectifying element on the other hand.

Referring again to Fig. 2, the current interrupter or rectifier of the headlight dimming circuit is embraced within the dotted outline 36 which corresponds to the housing similarly identified in Figs. 1 and 3. The schematic portion of the circuit within the dotted outline 36 includes leads A, B, and C, which are similarly identified in Fig. 3. Lead A is connected to a source of direct current potential such as the battery 37. This lead is connected to an intermediate point of the primary 38 of a transformer 39, the secondary 40 of such transformer being connected to a rectifier-filter 41 of standard design. It is evident that the battery current passes through opposit halves of the primary 38 upon successive engagements and disengagements of the two pairs of contacts 30—31 and 32—33. There is thus generated an alternating current which may be rectified and filtered by the rectifier and filter unit 41 and the output appears at the leads B and C. Lead D provides a ground connection for the vane and the coil 28.

Referring now to Fig. 3, the electrical and electronic control circuit necessary to produce the automatic dimming of the headlights will be explained. Upon closing of the switch 42, which may be located on the instrument panel of the motor vehicle, power is supplied to the electrical and electronic components of the circuit from the battery 37. For automatic operation of the automobile headlights it is merely necessary to depress a foot switch 43 to bring the control circuit into high beam position. In high beam position, the foot switch engages contact 43H which is shown in Fig. 3 and in low beam position the switch engages contact 43L. Each headlight contains a pair of filaments, as represented by the symbols identified by the reference characters 44 and 45, which constitute high and low beam positions respectively.

The circuit includes an electron tube 46 which controls the relay coil 48 and through its associated contact 50 the relay coil 52. Normally the tube 46 is in non-conducting state and the coils of the relays are de-energized. When de-energized the relay 48 opens the switch 50 as shown and when energized it acts to close the switch. Relay 52 in de-energized condition brings switch 54 into engagement with contact 54H of the high beam filament circuit and when energized it causes the switch to engage contact 54L of the low beam filament circuit.

The circuitry is in the above high beam state at such times when the light image impinging on the photocell 27 is insufficient to produce a signal when amplified by the tube 56 to cause the tube 46 to conduct. When the slit 26 of the vane 24 crosses the image of an oncoming headlight, the light admitted through the slot of the vane 24 will be increased and there will be a sharp rise in the output of the photocell 27, which signal is coupled to the grid of the amplifier tube 56. The slope of the waveform is a function of the scanning speed and therefore the higher scanning speeds produce signals of greater amplitude. Since it has been found convenient to differentiate the photocell output the steeper wavefront is readily adaptable to such network. A wave of greater amplitude and therefore a higher signal to noise ratio results from the application of steeper wavefronts to the differentiating network. The differentiating network which comprises the capacitor 55 and the resistor 57 is in the grid circuit of the amplifier tube 56. The amplified output is then coupled to the tube 46 which controls the relay coil 48. The detected signal will trigger the tube 46. A capacitor 59 is provided in the grid circuit of tube 46 to maintain the signal level during successive scans. The sensitivity adjustment resistor 58 is provided in the cathode circuit so that the triggering level of the tube 46 may be pre-set to allow it to conduct at a minimum signal level upon the detection of headlight of an approaching vehicle at a desired maximum distance. When the tube 46 conducts, the relay coil 48 is energized and it operates to close its contact 50 thereby in turn energizing the relay coil 52. The energization of relay coil 52 operates its associated contact 54 which causes the headlights to be switched to the low position. The relay coil 48 is provided with a capacitor 60 connected across its terminals of sufficient capacity to keep the relay contact 50 closed during successive scans.

When the headlight image moves out of the image rectangle 18 the tube 46 will be cut off and the relay coil 48 upon being de-energized will open up its associated contact 50. The relay coil 52, however, will be maintained energized for a time determined by the resistance-capacitance time constant of the resistors 62 and 64 and the capacitor 66. The provision of this time delay prevents the headlights from switching to the high beam position during the interval successive approaching vehicles come within the range of detection of the system. The time delay may be varied by adjusting the variable resistor 64. If no new headlights appear the relay 52 will become de-energized and the contact 54 will be switched back to the high beam position.

It is, therefore, clear from the foregoing description that the present invention has advanced the state of the art by providing an improved inexpensive automatic headlight dimming device based on the scanning of a selected portion of the driver's field of vision including the image of an approaching headlight. The scanning is accomplished by a rapidly oscillated slotted vane which provides higher scanning speeds and larger usable signal outputs. The device may combine the oscillatory vane with the vibrator of the rectifier as described herein to reduce the number of components in the system. The device employs a minimum of bulky elements resulting in an inexpensive, rugged dependable automatic headlight dimmer.

Having, therefore, described detailed embodiments of the invention setting forth their organization and their mode of operation, those features believed descriptive of the nature of the invention are defined with particularity in the appended claims.

What is claimed is:

1. An automatic headlight dimming device comprising a lens system positioned to focus an image of a driver's field of vision, a vibrating vane positioned to oscillate back and forth across the focussed image and interrupt the projection of the focussed image, a light sensitive element positioned to receive the interrupted focussed image, a headlight dimming circuit connected to the light sensitive element and controlled by the output signal thereof, means forming part of said circuit for connecting the same to a direct current voltage source, a current inverter operably connected into said last means and utilizing the oscillations of said vibrating vane as a switch medium for alternating the direction of the direct current received from said source, and a power amplifying transformer operably connected to the current inverter and to the headlight dimming circuit and effective to amplify the current before use by the latter.

2. An automatic headlight dimming device comprising a light condensing system positioned to form an image of a selected portion of the driver's field of vision, a slotted scanning vane positioned to intercept the light image and being dimensioned to mask down said image simultaneously with scanning same, magnetic means for driving the scanning vane back and forth across the light image a light sensitive element positioned to receive the scanned light image and provide an output signal proportionate to the light received, an electronic headlight dimming circuit controlled by the output signal of the light sensitive element, means in said dimming circuit for connecting the light sensitive element to a voltage source to receive direct current therefrom, a vibrator type rectifier in the dimming circuit for changing the direct current received by the same to an alternating current, the image scanning vibrating vane forming the current interrupting member of the rectifier and thus serving the dual function of interrupting the light image received by the light sensitive element and the direct current received by the dimming circuit.

3. In an automatic dimming device for a motor vehicle including, in combination, means for receiving and focusing an image of light of the driver's field of vision, a light sensitive element positioned to receive the light image and to provide an electrical control signal proportional to the brightness thereof, a light interrupting element interposed between the light focusing means and the light sensitive element and movable rapidly back and forth across the path of the light image, the light interrupting element including a pair of switch contacts associated with said light interrupting element and movable in response to the movement thereof, means for driving the light interrupting element rapidly back and forth across the path of the light image, a power amplifying transformer having primary and secondary windings, a circuit connectible to the vehicle battery and including the primary winding of the transformer and a second pair of switch contacts so positioned with respect to the first pair of switch contacts as to be alternately engaged thereby and operable in response to such engagements to cause the current from the battery to flow alternately in opposite directions through the primary winding of the transformer, and vehicle headlight dimming means connected to the secondary winding of the transformer and deriving power therefrom for operation.

4. In an automobile headlight dimming system, a circuit including a light sensitive element positioned for receiving light from the driver's field of vision and having means for receiving energy from a source of direct current for operation, a rapidly vibrating member, means positioning the vibrating member so that it intercepts the light received by said light sensitive element, switch means operatively associated with the vibrating member and responsive to the movement thereof for interrupting the direct current from said source to provide variations in the current flow, and means responsive to the variations in the current for providing power for switching an automobile headlight from high beam to low beam conditions and return.

5. In an automatic headlight dimming system including, in combination, means for focusing an image of a desired portion of the driver's field of vision, means for receiving said focussed image and for producing an output signal proportional to the strength of the image, means responding to a given strength of the received image for dimming the headlight, said last means connectible to a source of direct current and having a vibrator type of inverter for converting the direct current to alternating current, and means carried by the vibrator of said inverter device and oscillatable across the focussed image received by said image receiving means for scanning the image.

6. In an automatic automobile headlight dimming system comprising a lens system oriented to condense and focus an image of a desired portion of the driver's field of vision, a housing enclosing the lens system and having an aperture at one end to allow the focussed image to pass therethrough, a slotted oscillatable vane including a pair of switches alternately closable in response to the swinging movement of the vane, the slotted vane being positioned to sweep back and forth across the focussed image passing through the aperture of the housing, magnetizable means connectible through said pair of switches to the vehicle battery and operable when magnetized and demagnetized to oscillate the vane, the alternate closing and opening of the pair of said switches being effective to alternately magnetize and demagnetize said magnetizable means thereby causing the slotted vane to oscillate across the focussed image and the slot therein to scan the same, a photoelectric device positioned in line with the scanned image to receive the same and operable to provide an electrical signal therefrom, an electron discharge device connected to the photoelectric device and actuatable in response to a predetermined signal from said device, and a relay including an energizable winding and an armature controlled switch, the energizable winding of the relay being connected to the electron discharge device and being energizable upon conduction of the device to operate its armature controlled switch, the last mentioned switch being connected into the headlight circuit to control the dimming of the headlight in response to the energization of the winding.

7. In an automatic headlight dimming system having an optical system for producing an image of a desired portion of the driver's field of vision and light responsive means for converting the light from the image into an electrical output and for controlling a headlight timing circuit therefrom, means for scanning said image including a vibratory blade carrying a vane which is movable back and forth across the image, the vane being so dimensionally proportioned with respect to the image that in any position of its vibratory movement it cuts off the image, and said vane further having an elongated relatively narrow slot therethrough extending transversely to the direction of vibratory movement of the vane and acting as the vane vibrates to sweep back and forth across the image to scan successive portions thereof.

8. An automatic headlight dimming system including, in combination, a lens system for focusing an image of the driver's field of vision, a light sensitive element positioned to receive the focussed image and for converting the image received into an electrical output, means between the lens system and the light sensitive element providing a masking aperture limiting the area of the focussed image, electric circuit means connected to the light sensitive element and responsive to the electrical output thereof for controlling the switching of the headlight from bright to dim position and return, a vibratory arm positioned adjacent to the focussed image and oscillatable about an axis paralleling the projection of the image, means for rapidly oscillating the arm about its axis, and a vane carried by the arm movable therewith and positioned so as to sweep back and forth across the focussed image as the arm oscillates, said vane being so dimensionally proportion with respect to said aperture that at any position of its vibratory movement it blocks the passage of the image therethrough, said vane further having a narrow slot in the center of the vane extending transversely to the movement thereof and acting to admit the passage of successive areas of the image passing through the aperture and thus scans successive areas of such image.

9. In an automatic automobile headlight dimming system, means for focusing an image of a desired portion of the driver's field of vision, a movable apertured member positioned to intercept the focussed image and operable when moved to scan successive discrete small areas of said image, a light sensitive element positioned to receive the scanned image and to provide an electrical control signal proportional to the brightness thereof, means for moving the apertured member to provide said image scanning operation, a headlight dimming circuit connected to the light sensitive element and controlled by the output signal thereof, a current inverter electrically connected to said circuit and adapted to be connected to a source of direct current, said current inverter including a pair of switches operable when alternately closed to alternately reverse the direction of current flow to said circuit, and means engageable by the apertured member and responsive to the scanning movement thereof for alternately closing said switches to thereby provide an alternating current for use by said circuit.

References Cited in the file of this patent

UNITED STATES PATENTS

| | | |
|---|---|---|
| 2,000,948 | Hayes | May 14, 1935 |
| 2,562,910 | Hardy | Aug. 7, 1951 |
| 2,632,040 | Rabinow | Mar. 17, 1953 |
| 2,679,616 | Onkensen et al. | May 25, 1954 |